United States Patent [19]

Alford

[11] 4,107,688

[45] Aug. 15, 1978

[54] MONITOR FOR LOCALIZER ANTENNA ARRAYS

[76] Inventor: Andrew Alford, 71 Bacon St., Winchester, Mass. 01890

[21] Appl. No.: 640,749

[22] Filed: Dec. 15, 1975

[51] Int. Cl.$^{2}$ ................................................ G01S 1/16

[52] U.S. Cl. ................................ 343/108 R; 325/133; 343/109; 343/703

[58] Field of Search .................. 343/108 M, 109, 703; 325/133

[56] References Cited

U.S. PATENT DOCUMENTS

| | | | |
|---|---|---|---|
| 3,713,160 | 1/1973 | Becavin | 343/108 R |
| 3,818,476 | 6/1974 | Coulter et al. | 343/108 R |
| 3,868,689 | 2/1975 | Liu et al. | 343/703 |

*Primary Examiner*—Maynard R. Wilbur

*Assistant Examiner*—Richard E. Berger

[57] ABSTRACT

Monitor comprises approximately matched means for sampling currents in the radiating elements. The sample currents are divided into three sets of parts. One set is used for monitoring course position, another set for monitoring course width and the third set is used to monitor magnitudes of the currents in the radiating elements. The interference by the samples in the first and second sets with the monitoring of magnitudes is greatly reduced by selecting path lengths used in the course position and course width monitoring systems so that the interfering effect of the samples in the first and second sets nearly cancel each other. The magnitudes of the currents in the third set are compared with preset standards.

4 Claims, 12 Drawing Figures

MONITOR FOR LOCALIZER ANTENNA ARRAYS

In order to make sure that the landing aircraft is receiving correct signals from an instrument landing localizer, it is necessary that the monitor indicate the angular position of the localizer course preferably in terms of deviation from its correct position along the center of the runway. Should the indicated deviation exceed the maximum allowable deviation the localizer would be automatically turned off by the monitor. There should also be another monitor indication, namely, that of the "course width." This parameter controls the correlation between the angular position of the aircraft with respect to the course as indicated in the aircraft and the actual angle measured from the course. This correlation must remain unchanged in order that the pilot may interpret what he sees on the meter in terms of just how far his plane is from the continued centerline of the runway at any time during the final approach. To make sure that no undue change takes place in the course width this quantity should be monitored.

In addition to the course position and the course width monitors it is important to make sure that no misleading information be sent out to the aircraft also within other than central portions of the ±35° sector and preferably within a still wider sector. In fact, as normally adjusted, the aircraft localizer meter should give an off-scale indication within the entire ±45° sector, except within the narrow central portion specified by the "course width" which depending on the runway length is usually set at a value between 3° and 8° wide. Should the needle of the meter in the aircraft start moving away from the off-scale position toward the center of the scale when the aircraft is, say, at an angle of 25° from the course, the pilot may be mislead into making a preparatory turn into the direction of the course in the belief that he is close to it. Such a premature turn may result in waste of time and in confusion at a busy airport control tower. The monitoring system should therefore be preferably such as to either warn the control tower or turn the localizer off should such improper indications be sent out in any direction within the ±35° sector. The monitor which indicates that the signal is such that it would result in less than offscale indication in the aircraft outside the central sector, one course width wide, may be called a "clearance monitor."

Over and above the requirements imposed by the need of monitoring possible changes in the parameters which would result in either dangerously erroneous or in misleading indications on the meter in the aircraft it is very desirable to monitor the magnitudes of the currents in the individual radiating elements so that any significant change in the localizer system would result in, at least, a warning indication in spite of the fact that the observed change may not be of the type or of sufficient magnitude to substantially alter the indications received by the aircraft.

A simple arrangement for monitoring currents in the radiating elements may be designed so that it would just have sufficient sensitivity to respond to short circuits or open circuits in the feeder system. For example, a rudimentary arrangement of this type may comprise a sampling means which delivers a representative sample of the current in a radiating element to a detector that converts this rf sample current into a direct current used to operate a sensitive relay. There would be one such relay for each radiating element. Under normal conditions the sample currents are sufficient to keep all relay contacts in the "closed position" so that current would be allowed to flow freely through the contacts. If all the contacts were connected in series with an indicating device with an external source of current, the opening of the contacts of any one of the relays would be sufficient to interrupt the current through the indicating device. The rudimentary system, using relays of the type in which an iron plate is pulled against a spring by a solenoid can respond only to large changes in the radiating element currents such as would be produced by an open or by a short circuit in a feeder supplying power to one of the elements. This arrangement as described is not useful for detecting relatively small changes in the radiator currents but could be improved by the use of more expensive relays such as for example so called meter relays. A further limitation imposed on a system using relays is the fact that the currents in the end elements of a large localizer array are very small when the total power supplied to the array is around 12 or 15 watts as is usual in present day solid state transmitter installations. Under these conditions the rectified sample currents are then likely to be only one or two hundred microamperes which makes the use of relays at least very expensive if not impractical.

This problem can be solved in a satisfactory way with the aid of solid state amplifying devices. A dc current of 100 microamperes flowing through a 5000 ohm resistor produces a drop of 0.5 volts which is more than sufficient to operate a comparator circuit in which the incoming 0.5 volt potential can be compared with a preset standard potential. When the incoming potential falls below the standard potential by a small amount, the circuit suddenly changes to another state. When the incoming potential increases, becoming by a small amount greater than the standard potential, the circuit returns to its original state. Several such circuits can be connected together so that there are, say, several incoming potentials being compared to one or to several preset standard potentials. The circuit arrangement is such that a large change in the output takes place whenever one of the incoming potentials drops just below the corresponding standard. The output of this circuit is at a sufficiently high level to operate another, similar device or an amplifier followed by a relay. Such solid state circuits offer more than just a substitute for unusually sensitive and expensive relays. In fact, such circuits, because of their remarkable stability and reliability, make it practical to monitor small changes in the radiator currents. This is useful because the rf power supplied by a solid state localizer transmitter can be kept almost constant over long periods of time so that the magnitude monitor can be made sufficiently sensitive to respond not only to possible major faults but also to possible smaller changes in the various parts of the system. In fact, this makes this kind of a magnitude monitor capable of performing two functions (1) Act as a clearance monitor. (2) Act as a maintenance monitor which can indicate abnormal conditions in the antenna system that do not result in either substantial course shifts or in substantial changes in the course width. In the past in order to obtain course position indication the sampling was done at a distance from the antenna by picking up a sample of the course signal with a dipole. By using such a sample three quantities were monitored: The signal magnitude, the percentage of modulation and the difference between the 90 and 150 cycle sidebands. The last quantity gave an indication of the course displacement. The course width monitor sample was also picked up by a dipole placed at a distance from the array at 2 or 3° from the course. The difference between the 90 and 150 cycle modulations was used to determine the course width. This arrangement often suffered from interference by reflected signals from aircraft flying over the localizer array and with larger arrays failed to respond to major faults, such as short circuits and open circuits in the line feeding some of the elements.

Another system for obtaining samples made use of two dipoles symmetrically arranged in the near field of the array. These dipoles were turned so as to receive less signal from the central portion of the array and more signal from the end elements of the array. When the signals from the two dipoles were added in a hybrid the result obtained was similar to the carrier plus sidebands signal hereafter referred to as CS Signal. The difference output of the hybrid delivered the sidebands only signal hereafter referred to as SO signal. This SO signal was added to a portion of the CS signal obtained at the sum port of the hybrid in order to obtain a sample that was similar to one which would be received by a dipole at 2° or 3° angle off-course in the far field. This near-field sampling system was frequently unstable because it received not only the direct signal from the elements in the array but also signals reflected from the ground, reflecting properties of which varied with the weather. Ground screens used to reduce this effect were only partially successful.

The system which can be made to result in stable samples that are affected neither by aircraft flying over the array nor by the weather comprises the addition of the samples obtained from individual radiating elements by coupling means placed in the immediate neighborhoods of the current carrying portions in these elements. For the sake of stability and simplicity it is preferable to extract sufficient power even from each of the end elements in the array to avoid amplification prior to detection or the use of modulation. Experience shows that it is preferable to extract not less than 1/40th of the power fed into the element. The addition of the individual samples is carried out in resistance networks. The added samples contain the same information as would be obtained with distant pickup antennas.

Two separate additions of the same samples are required, one in which all samples are added in the same relative phases and another, in which the samples are added in progressively delayed phases. The in-phase addition gives the "on-course" CS signal. The addition after applying progressively increasing phase delays gives the equivalent of the "off-course signal." In order to monitor the currents in the radiating elements a third group of samples is required. To obtain these three groups of samples only one sampling means per radiating element is needed. The sample delivered by each sampler may be divided into three parts. Since the "on-course" and the "off-course" monitors need relatively small signals the division may be made unequal so that the magnitude monitor receives a large sample. Unequal division is preferable because larger samples result in simpler circuits and in greater stability of the magnitude monitor.

In order to obtain the "on-course" and "off-course" monitor indications which are truly representative of the indications obtained in aircraft under normal and under abnormal conditions in the array the added samples must have magnitudes proportional to the magnitudes of the sampled currents and in relative phases which differ by only a constant value from the relative phases of the currents in the radiating elements. A simple way to obtain such true analogs is by making sampler pickup devices identical to each other on all radiating elements and provide equal treatment of the samples by other circuit elements. The added samples will then be true analogs. Since the power delivered to the antenna elements near the center of the array is much greater than the power delivered to the end elements there is a tendency for a fraction of the samples representing the central elements to leak through the resistive summing network and appear in the lines carrying much weaker samples from the end elements. If isolation in sample dividing network is not very large, for example 15 dB (even when a sampler of this invention is used) some of this power from the central elements finds its way into the magnitude monitor. There are several means which may be used singly or in combination for the practical elimination of this undesirable effect. One means comprises a combination of the sampler loop exceeding certain minimum dimensions in area, a limitation in conductor size, and a sampler matching means which may include a lossy device dissipating, for example, ½ of the sample power. A really good and constant match over the localizer band of frequencies extending from 108 MHz to 112 MHz is difficult to obtain with a sampler of a practical size particularly when it is desired to avoid wasting power and without using amplifying devices. The amplifying devices located at the samplers are objectionable because they would require additional auxiliary equipment such as lightning surge protection, a supply of DC power, additional cables, etc. and would reduce the overall reliability of the system. A system requiring the retuning of the balancing loads for each operating frequency would also be objectionable for several reasons among which the lack of stability with change in temperature.

Once a reasonable degree of matching of the sampler is achieved, it is possible to obtain a measure of isolation between the resistive adding networks and the inputs to the magnitude monitor by using hybrids over the entire frequency range. A practical degree of matching over the localizer band was found to be one corresponding to the standing wave ratio around 2.0. This degree of matching, however, results in about 15.5 dB isolation in the hybrids which is not sufficient to fully isolate the magnitude monitor from some interference which may be caused by otherwise satisfactory and economical adding networks. A second means is therefore required when large resistive star adding networks are used. This means comprises introducing phase delays that result in the signals which leak through the two sets of resistive adding networks arriving in relative phases differing by values close to 180° at the hybrids supplying the sample power to the resistive networks. The exact 180° relationship cannot be achieved over the whole localizer frequency range but an approximation to it is sufficient to result in almost complete elimination of the interference when used together with a sampler having an SWR=2. Another embodiment of said second means comprises a combination of at least two resistive adding networks for each side of the array and a hybrid for adding the outputs of each pair of said resistive networks.

One objective of this invention is to provide a system for use with localizer arrays operating at any frequency within the localizer band which is capable of monitoring the deviation of the course from its normal position along the centerline of the runway, the course width and the magnitudes of currents in each of the radiating elements in the localizer array.

Another objective of this invention is to provide a localizer array monitor which would respond to any reasonably probable fault that could affect the course position, course width or result in less than off-scale indication outside the central sector but within the ±35° from the course.

Still another objective of this invention is to provide an effective means for obtaining samples of sufficient magnitude for use with a stable magnitude monitoring system.

Still another objective of this invention is to provide a means for distributing the sample signals among the three monitoring systems, that is, between the magnitude monitor, course position monitor and the course width monitor system.

Other objectives, features and advantages of the present invention will be apparent from the following description of an embodiment of the invention which represents the best known use of the invention. This embodiment is shown in the accompanying drawings in which.

Figure 1:
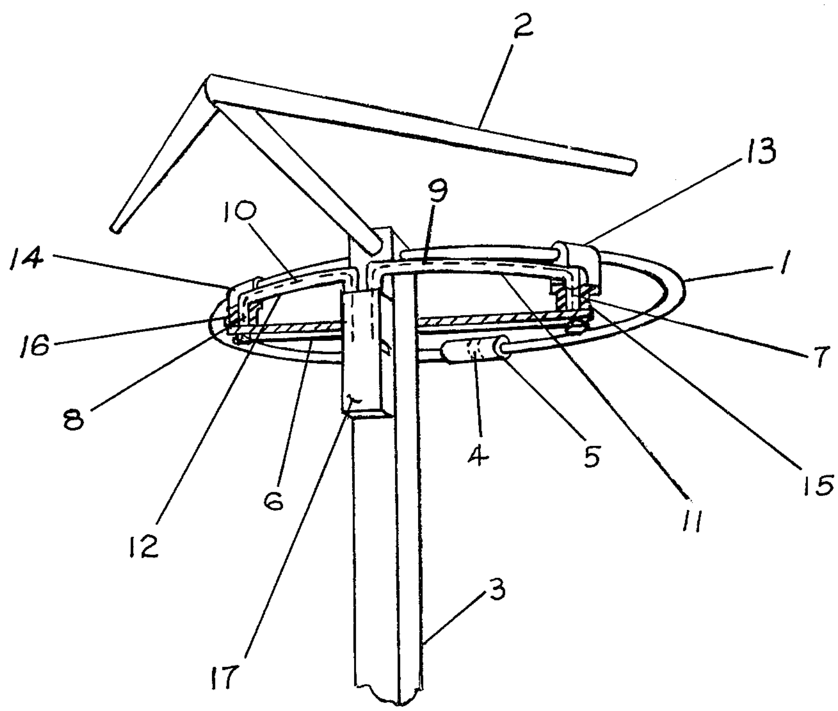
FIG. 1 shows one embodiment of the current sampling means of this invention.

FIG. 1 shows one form of a sampling device which may be used to sample currents in a V-ring radiating element. A V-ring element consists of a metal tube bent into a loop 1, V-shaped reflector 2, supporting metal mast 3, a gap 4 in loop 1 enclosed in a small radome 5. The loop 1 is fed across the gap 4 by a coaxial feeder which is brought in thru the mast and thru the space within the tube forming loop 1. The maximum rf current in the loop is observed in the immediate neighborhood of mast 3. The center of mast 3 is at zero potential.

The sampler comprises a metal bar 6 placed in the vicinity of the loop conductor 1. The metal bar 6 is supported by inner conductors 7, 8 which are continuations of the inner conductors 9, 10 of two coaxial cables 11, 12. The outer conductor of cable 11 is connected to metal fitting 13 which is clamped to the loop conductor 1. Similarily, the outer conductor of cable 12 is clamped to metal fitting 14 which is also clamped to loop conductor 1. Insulators 15, 16 are used to protect and furnish support for the inner conductors 7, 8. Cables 11, 12 enter metal box 17 which contains a balun 18, a resistance pad 19 and matching shunt stub 20 as shown in the schematic diagram of FIG. 2. The output of the sampler is carried by the coaxial line 21 to the monitor network shown in FIG. 5.

The following dimensions were found to result in a useful sampler: Bar 6 was 24 inches long and ½ × ¼ inches in cross section. It was spaced about 2 ¾ inches from the surface of loop 1. The area enclosed between bar 6 and the surface of loop 1 is around 70 square inches. Cables 11 and 12 were 75 ohm cables and served as transformers.

Figure 2:
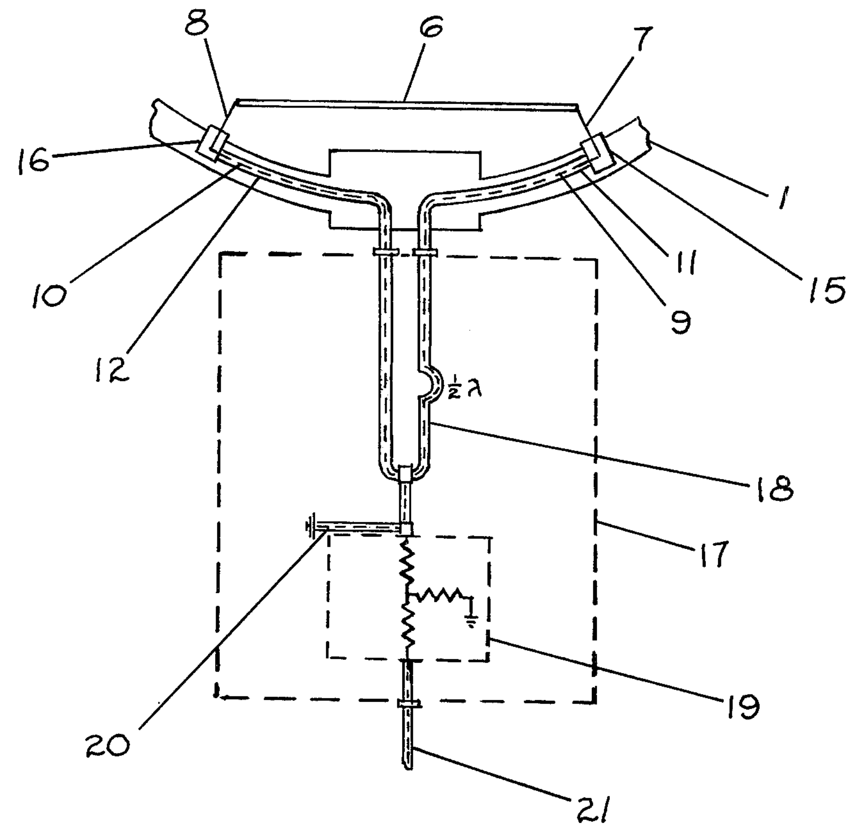
FIG. 2 is a schematic diagram of the sampling circuit.
Figure 3:
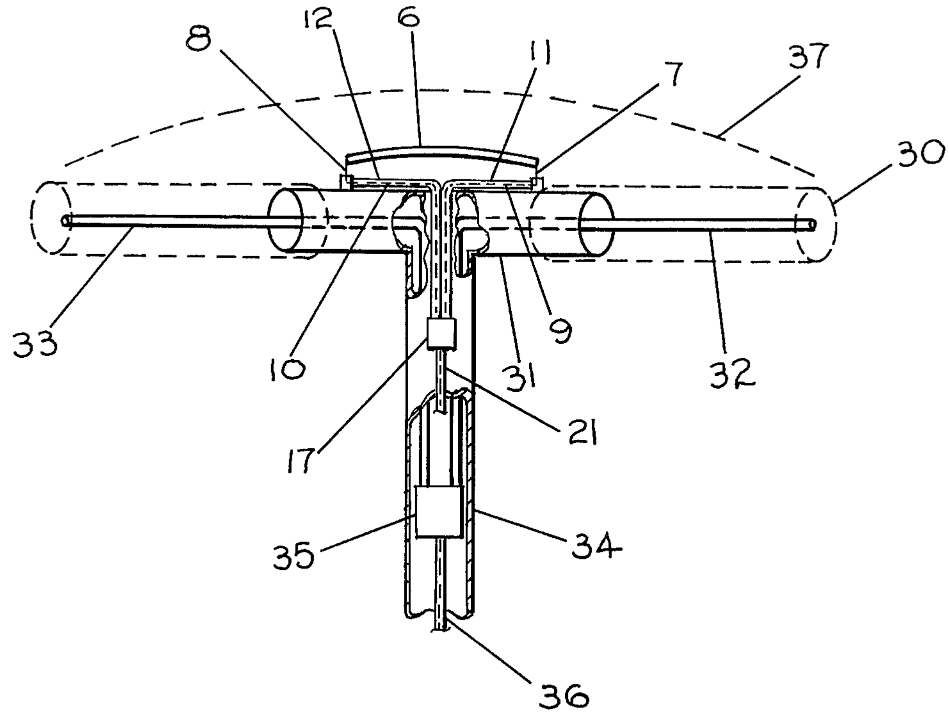
FIG. 3 shows another embodiment of the sampler for use with a sleeve dipole.

Another embodiment of the sampler of this invention is shown in FIG. 3 where in the radiating element is a sleeve dipole consisting of the central tubular portion 31, two outer radiators 32, 33. Central tube 31 is supported by a metal tube 34 which usually encloses feeding balun 35 fed by the coaxial line 36. The radiating portions of this dipole are 31, 32, and 33. The outer radiators are protected by radome 30. The balun and the matching means of the sampler are enclosed in box 17 and are similar to those shown in FIG. 2. The current distribution in the dipole is schematically indicated by dashed line 37. The maximum of the current occurs at the center of the dipole, that is, at the support 34. This center of this dipole is also the voltage minimum. The sampler comprises the pickup bar 6, coaxial lines 11, 12. The inner conductors 9, 10 of the coaxial lines 11, 12 are connected to the ends of the pickup bar 6 which may be straight or curved. The insulators supporting the extended inner conductors 7, 8 are not shown. These insulators could be of the type shown in FIG. 1. In that figure the insulators were designated by numerals 15, 16.

Figure 4:
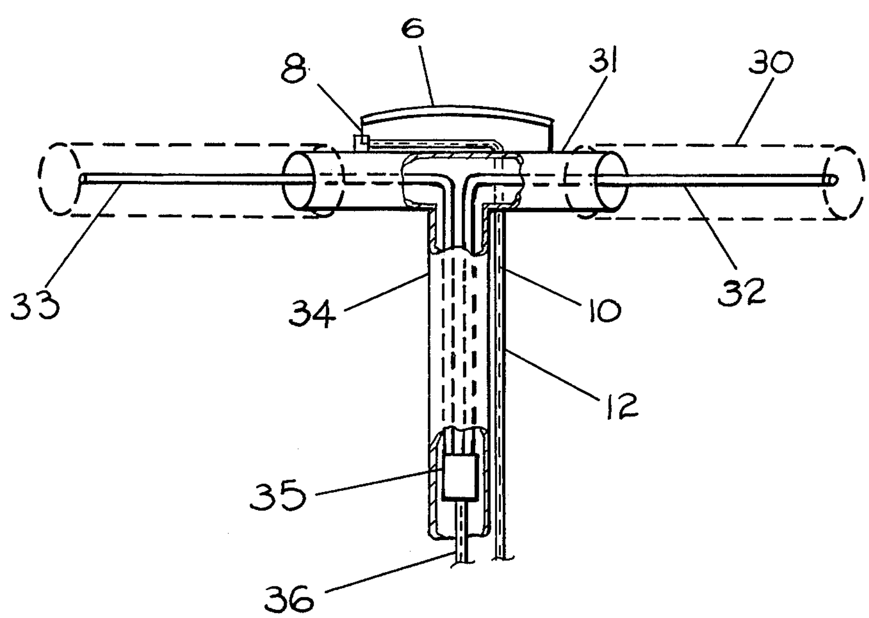
FIG. 4 shows a portion of the sampler of the unbalanced type.

The samplers shown in FIGS. 1, 2, 3 are of the balanced type requiring the use of a balun as well as of a matching network. In FIG. 4 is shown a sampler which is in some respects unbalanced. It will be convenient to refer to this type of a sampler as an "unbalanced" sampler even though it can be arranged so that the unbalance introduced by it into the radiating element is not large enough to substantially affect the radiation patterns of the array. It is well to keep in mind, when discussing such unbalanced samplers, that unbalance introduced by the sampler into the antenna, other things being equal, increases with the fraction of the power extracted by the sampler. When the sampler is very small it has a negligible effect on the antenna unless it is sharply tuned which is very undesirable because such sharp tuning would automatically preclude the use of the sampler over the localizer frequency band in addition to making it sensitive to the temperature, ice and even snow. When a small sampler is sufficiently broadly tuned it extracts a very small fraction of the power so that its output requires substantial amplification. Larger samplers, such as were described in connection with FIGS. 1, 2 and 3 can be broadly tuned and still extract sufficient power even from the end elements of the array.

In many respects the sampler of FIG. 4 is similar to the sampler in FIG. 3. The principal obvious distinction between the two samplers is that each end of bar 6 of the sampler in FIG. 3 is connected to an inner conductor of a coaxial line whereas in the sampler of FIG. 4 only one of the two ends of bar 6 is connected to the inner conductor 10 of one coaxial line 12; the other end of bar 6 is connected to the central part 31 of the sleeve dipole. The second coaxial line, line 11 is not used and no balun is required. The impedance looking back into the bar is higher than it is in the arrangement of FIG. 3 and this fact makes the sampler of FIG. 4 more difficult to match over the whole localizer frequency band. The matching arrangement and the lossy pad are not shown in FIG. 4.

Figure 5:
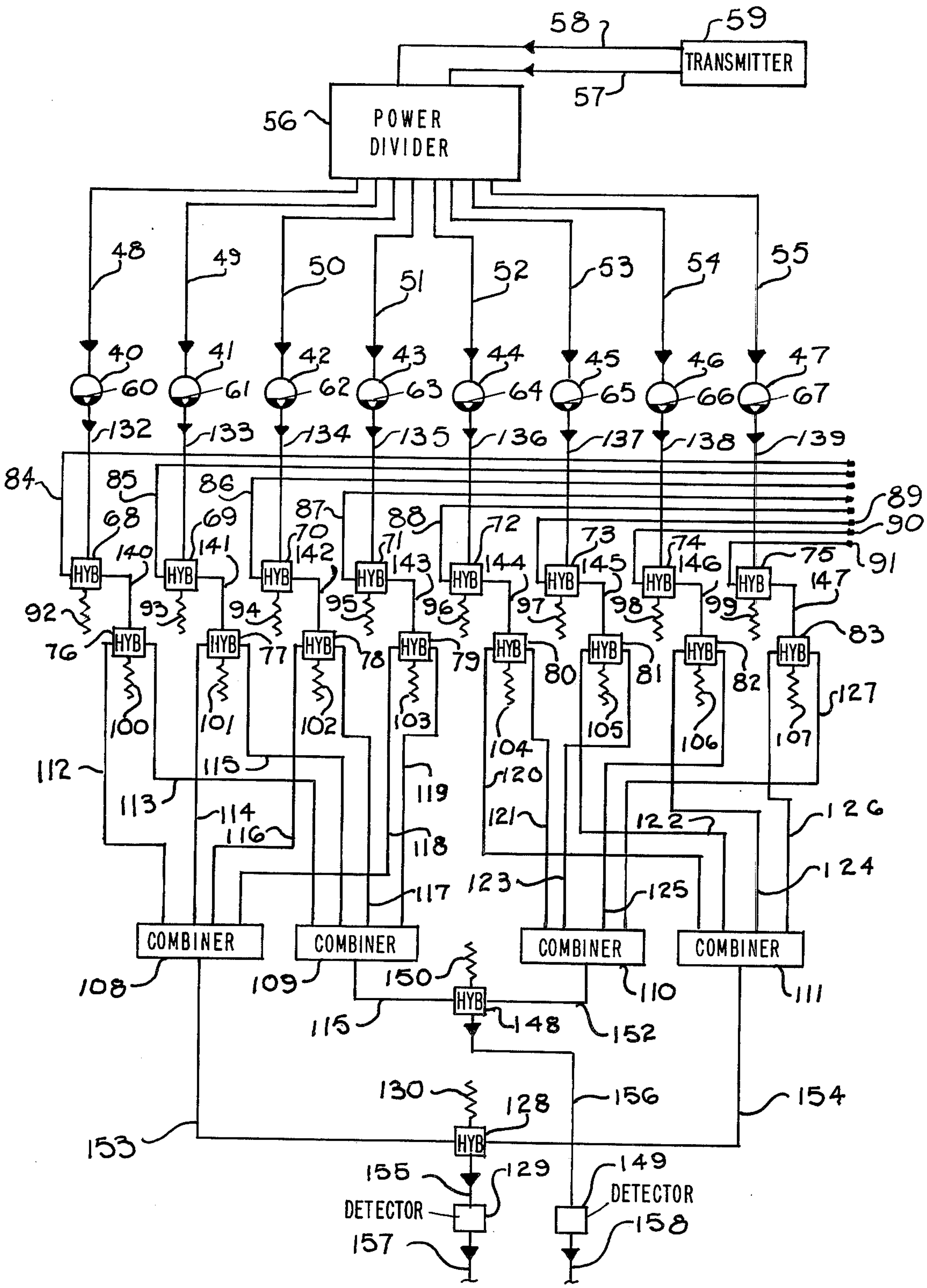
FIG. 5 shows a circuit diagram of the monitor system of the invention.

FIG. 5 is a block diagram which shows an antenna array comprising eight radiating elements 40, 41, . . . 47 which is fed by cables 48, 49 . . . , 55 that carry rf power from the distribution network 56 to the radiating elements 40, 41, . . . , 47. RF cables 57, 58 supply the SO and the CS power from the localizer transmitter 59 to the power distribution network 56. Samplers 60, 61, . . . , 67 supply sample power to hybrids 68, 69, . . . , 75. Each hybrid such as, for example hybrid 68 divides the power delivered from the sampler into two parts, one part is delivered to another hybrid, hybrid 76 for division into two parts and the other part of the first hybrid delivers to the magnitude monitor over cable 84. There are eight first row hybrids such as 68, 69 . . . , 75 and eight second row hybrids such as 76, 77, . . . , 83. There also are eight cables 84, 85, . . . , 91 carrying power to the magnitude monitor which may be of the types shown in FIGS. 9 and 10. Terminations 92, 93, . . . , 99 and 100, 101, . . . , 107 are used to increase the isolation between the side ports of the hybrids to reduce the transmission of the back wave from a second row hybrid such as 76, into cable 84 through the hybrid 68.

The side ports of the second row hybrids are connected to resistive networks 108, 109, 110, 111 through cables 112, 113, . . . , 127. The outputs of the resistive networks 108 and 111 are connected to side ports of hybrid 128. The output of hybrid 128 is fed to detector 129 which supplies dc and other products of detection to a conventional monitor indicator. In some cases monitor indicators are provided with detectors so that detector 129 may be omitted and the output of hybrid 128 may be connected directly to such a monitor indicator. Termination 130 is used to increase the isolation in the adding hybrid 128. The outputs of networks 109, 110 are similarly added in hybrid 148 which supplies the off-course sample power to detector 149. Termination 150 is used to balance the hybrid and to thus increase the isolation.

It is convenient and economical to make cables 132, 133, . . . , 139 supplying power to the first row hybrids from the samplers of equal electrical lengths. It is also desirable to connect the second row hybrids directly to the first row hybrids so that the coaxial connections 140, 141, . . . , 147 all have the same electrical lengths. When this is done it is easier to control the intended differences in the lengths of other lines.

Electrical lengths of lines 112, 114, . . . , 118, 120, 122 . . . , 126 are made equal to, say, $L_o$ measured in wavelengths. These lines supply resistive adding networks 108 and 111 that are connected by lines of equal lengths to hybrid 128 that adds the two signals and delivers the sum which is the on-course signal sample to detector 129.

The electrical lengths of cables 113, 115, . . . , 127 are not made equal to each other but must differ from each other by amounts that will be calculated. Let the length of cable 113 be $L_1$ measured in wavelengths to be chosen as will be described later. Let $d_2, d_3, d_4, \ldots, d_8$, measured in wavelengths, be the distances measured from the outer element to the other elements in the array. For example, the distance between elements 40 and 41 is $d_2$. The distance between elements 40 and 42 is $d_3$ and so on. Let $\theta_1$ be the angle from the course at which one would wish to observe the off-course signal to be used for determining the course width (it is customary but not necessary to make $\theta_1 = \frac{1}{2}$ course width), then the lengths of the lines feeding resistive dividers 109, 110 may be calculated as follows:

$$L_2 = L_1 + d_2 \sin\theta_1;\ L_3 = L_1 + d_3 \sin\theta_1, \ldots L_8 = L_1 + d_8 \sin\theta_1$$

In order to find the actual lengths it is necessary to choose the value of $L_1$. The choice of $L_1$ is made on the following basis: The signals received by the resistive divider 108 from the elements on the left side of the array are not all of the same magnitude. On the contrary, the signals received from the elements near the center of the array are very much stronger than the signal received, say, from the end element (element 40.) For this reason, if network 108 has only moderate isolation between its inputs, which is usually the case, the strong signals from the central elements leak via line 112, pass through hybrid 76, with only a 3 dB loss, into connecting line 140. Because of the relatively poor match of the sampler (SWR = 2) the isolation of hybrid 68 is then only about 15 dB so that the total path between network 108 and line 84 to the magnitude monitor presents a total attenuation of about 18 dB. It is found this attenuation is not in itself sufficient to protect the magnitude monitor from the interference by the strong signals picked up by samplers on the central elements. This is particularly true because a similar interfering signal and of almost the same strength arrives at hybrid 68 via line 113 from resistive network 109. If these two signals were in the same relative phase they would add and the interfering signal delivered to line 84 would increase by 6 dB. It is possible to make use of this effect to reduce the interference to a point where it is negligible. This can be done by choosing the difference in the lengths ($L_1$-$L_o$) such that the interfering signals arriving at hybrid 76 via lines 112, 113 differ in phase by 180°. When this is approached the signal transmitted into hybrid 68, via line 140, is greatly reduced and the interfering signal leaking into line 84 via hybrid 68, is essentially eliminated.

The desired value of ($L_1$-$L_o$) may be calculated. For this purpose Let $\phi_2 = d_2 \sin\theta_1$, $\phi_3 = d_3 \sin\theta_1$, $\phi_8 = d_8 \sin\theta_1$ then the lengths of lines 113, 115, . . . , 127 are given by $(L_1 + \phi_2)$, $(L_1 + \phi_3)$, $(L_1 + \phi_4) \ldots, (L_1 + \phi_8)$. The length of path from hybrid 77 via line 115, to 109 and from 109 to hybrid 76 is then $L_1 + (L_1 + \phi_2)$. The path from hybrid 78 via line 117 to network 109 and then via line 113 to hybrid 76 is $L_1 + (L_1 + \phi_3)$. The path from hybrid 78 via line 119 to 109 and from there via line 113 to hybrid 76 is $L_1 + (L_1 + \phi_4)$. We need not consider the signals arriving at network 110 from the right side of the array because network 110 could send signals to hybrid 76 only via hybrid 148 which may be made to have a high isolation by making its termination 150 and the input to the detector well matched. If this were not the case one would have to take the signal imported via hybrid 148 into account. The signals arriving at hybrid 76, via network 108, from hybrids 77, 78, 79 all have the same delays, 2 $L_o$. If $i_1$, $i_2$, $i_3$ and $i_4$ are the currents in the elements 40, 41, 42 and 43 then the total current arriving at line 84 via leakage through network 108, may be represented by a vector $V_o$ $$\overline{V_o} = A \cdot (i_2 + i_3 + i_4) \cdot \exp(-jK2\,L_o) \quad (1)$$

where $K = 2\,\pi/\lambda$ and $A$ is a constant.

Similarly the total current entering line 84 via leakage through network 109 may be represented by vector $V_1$.

If $-2kL_o$ is regarded as the reference phase it is found that vector $$V_1 = A\exp[-jk(2L_1-2L_o)][\dot{L}_2\exp(-jK\phi_2) + \dot{L}_3 \exp(-jK\phi_3) + \dot{L}_4\exp(-jK\phi_4)] \quad (2)$$

One can calculate the phase $-P$ of the vector within the second bracket of equation (2). Only the relative values of the currents are needed because the magnitude is not used. One can then replace the vector in the bracket by B exp $(-jP)$. Since the phase of vector $V_2$ should be 180° one may write $$V_2 = A{\cdot}B\exp[-jK(2L_1-2L_o - jP] = AB\exp(-jK\pi)$$

By equating the exponents it is found that $$L_1 - L_o = 1/2K(\pi - P_1) \text{ wavelengths}$$

A similar calculation may be carried out for the currents entering line 85 as a result of leakage through lines 114, 115 from networks 108, 109. When this is done it is found that a somewhat different value of $L_1 - L_o$ is needed to obtain the 180° phase difference. This, however, is not necessary because the lowest current is normally in the end element. A somewhat greater leakage into line 85 is therefore allowable. When a similar calculation is carried out for the elements on the other (right) side of the center of the array, in order to determine the difference in the lengths $L_8 - L_o$ of the lines 127 and 126, it is found that this difference in lengths should be different from $L_1 - L_o$ determined for the left side of the array. This is not surprising because when making such calculations one tacitly selects the side of the course on which the signal would be monitored. If the opposite side were selected, the values of $L_8$ and $L_1$ would be swapped. The fact that $L_8$ and $L_1$ have different values makes it necessary to compensate for the difference in lengths $L_8 - L_1$ by making lines 151, 152 differ in their lengths by the same amount in order that the path from hybrid 76 to hybrid 148 differ from the corresponding path from hybrid 76 to hybrid 148 only by the desired value $d_8 \sin\theta_1$.

An eight element array was used to illustrate the invention because this array contains sufficient number of elements to serve as an illustration without requiring that drawings contain too much repetitious material. In the case of a larger array with an even number of elements each of the resistive adding networks may have a larger number of inputs. For example, for an array of 12 elements each such network could have six inputs and one output. The details of a network of this type are shown in FIG. 6 in which resistors are designated by letter R having the value of resistance equal to $$R - Z_o(N-1)/(N+1)$$

Where $N$ = the number of inputs and $Z_o$ is the characteristic impedance of the input and output lines.

Figure 6:
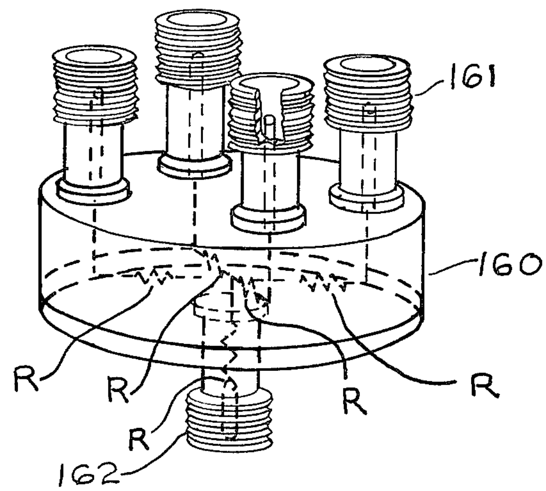
FIG. 6 shows a resistive star adding network with four inputs and one output.

In FIG. 6 each resistor is connected to the inner conductor of a coaxial line at one end and to all other resistors at the other end. The outer conductors of the coaxial lines are connected to a metal container 160, enclosing the resistors which may be arranged so that all but one resistor form a star configuration. The remaining resistor is centrally located perpendicular to the plane of the star. In FIG. 6, 161 is one of the four input connectors and 162 is the output connector. The voltage attenuation between an input and the output of this circuit is 1/N where N is the number of inputs. This attenuation is equal to the isolation between any two inputs. When expressed in dB it is equal to (−20 log N). For example, a resistive star circuit with four inputs attenuates by 12 dB. The isolation between any two inputs is also 12 dB.

Figure 7:
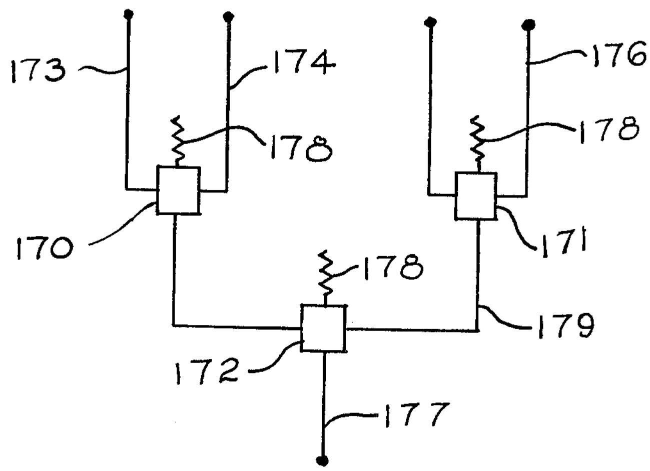
FIG. 7 shows an example of a matrix of three hybrids designed to add four signals.

If the addition of four samples is done with three hybrids such as 170, 171 and 172 as in the hybrid matrix of FIG. 7, the attenuation would be 6 dB and the isolation much higher than 12 dB. In FIG. 7 173, 174, 175 and 176 are coaxial inputs and 177 is the output. This is a better, but a more expensive way of adding several signals. This arrangement can be used to eliminate the interference with the magnitude monitor. Two matrices comprising three hybrids each is used to monitor the on-course signal of an 8-element array. Lines 173, 174, 175, 176 replace lines 112, 114, 116, 118 on the left side of the array. The hybrid matrix replaces resistive network 108 together with its connecting input lines. The output line 177 of the matrix is connected to line 153 feeding the adding hybrid 128. Similarly, a hybrid matrix of FIG. 7 is used to replace star network 111 and its input lines. The output line of the matrix is connected to line 154.

Two additional hybrid matrices are used to replace resistive networks 109, 110. The line length differences may be calculated as was explained in connection with FIG. 5 except that the adjustment of the fixed line differences between the on-course and off-course hybrid matrices to obtain the 180° relationship may still be necessary in spite of higher isolation obtained by the use of the hybrids because of the relatively poorly matched impedances transferred through the first and second row hybrids into the lines feeding the hybrid matrices.

Figure 8:
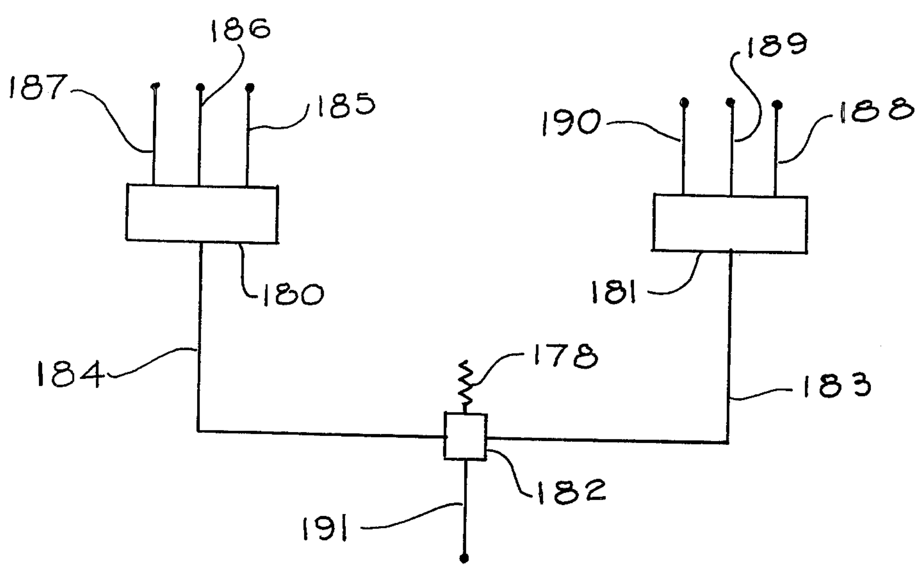
FIG. 8 shows two small resistive star circuits and a hybrid used to add their outputs.

A resistive star circuit with 6 inputs has attenuation and isolation of 15.6 dB. If the addition for each side of the array is done in two stars, such as 180, shown in FIG. 8 with three inputs in each star and with the outputs of these two small resistive star networks added in a hybrid 182 the attenuation is 9.6 + 3 = 12.6 dB but the isolation between the two groups of three inputs can be increased by the action of the hybrid to a value, over 20 db, when proper terminations are provided. This arrangement reduces the interference from the central elements in the array with the magnitude monitoring of the end elements but still allows the third element from the end to interfere with the magnitude monitoring of the end element and the 6th element from the end to interfere with the 4th element from the end unless the line lengths are adjusted to achieve the 180° relationships of the on-course and the off-course signals in two lines on each side of the array because the isolation in the small star networks with three inputs is quite low (9.6 dB). The calculations of the line lengths may be performed in accordance with the principles explained in connection with FIG. 5.

It is important to observe, however, that differentials in cost between different arrangements may well be offset if advantage is taken of the higher signal levels delivered to the monitor-indicator when a greater share of the addition of the sample signals is done in hybrids. Also a higher grade system is then obtained.

The common feature which is included in the several different arrangements for affecting the additions of the sample signals is a means for reducing signals which would interfere with magnitude monitoring of some of the elements. The interference reducing means comprise two steps. One step is the improvement of the isolation in the first row hybrids by providing means to improve the match of the samplers in order to achieve a better balance of the first row hybrids. The second step comprises one or a combination of several arrangements (1) an arrangement comprising selection of the difference in line lengths between the second row hybrids and the adding networks to achieve substantial cancellation of signals leaked through two different paths; (2) an arrangement comprising resistive adding networks each having only a few inputs, said networks being used in combination with a plurality of hybrids in combination with selection of line lengths to achieve the addition of the sample signals. (3) An arrangement making use of a matrix of hybrids with or without selection of line lengths as explained. (4) An arrangement comprising resistive networks in combination with lossy "T" pads inserted, for example, into lines such as 140, 141, . . . , 147 connecting the first row hybrids with second row hybrids, such lossy pads could also be inserted into the input lines of the resistive star adding networks. When this is done the number of pads is doubled. Such arrangements can be used when the sensitivity of the monitor-indicators connected to the "on-course" and the "off-course" outputs are sufficiently sensitive. The added lossy pads do not reduce the signals delivered to the magnitude monitor by the first line hybrids. Even when lossy pads are used it is preferable to select the line lengths so as to further reduce the interference with the magnitude monitoring.

When the antenna elements are of the traveling wave type it is possible to use all or a fraction of the power normally proceeding into the resistive terminations of these antenna elements. In this case the sample of the power fed to the element is only about 3.5 or 4 dB below the input power and is therefore relatively very large. Furthermore, such "samplers" are very well matched. A large loss may therefore be used into the lines supplying sample power to the adding star networks. Such loss may be in the form of directional couplers with low values of coupling. The conditions are therefore different from those encountered in arrays with unterminated elements such as, for example, V-rings and dipoles.

It is difficult to design a satisfactory current sampler for a conventional dipole because if it is made in the form of a loop with one conductor close to the dipole to obtain a sufficiently large sample, the arrangement becomes sensitive to the effect of ice unless it is enclosed in a fairly large radome. A sleeve dipole, besides being a more satisfactory structure, can be provided with a simpler and better sampler. Experience has shown that balanced samplers for sampling V-ring currents as described in connection with FIGS. 1 and 2 work well without radomes in a climate where wet snow and icing conditions are frequent.

Figure 9:
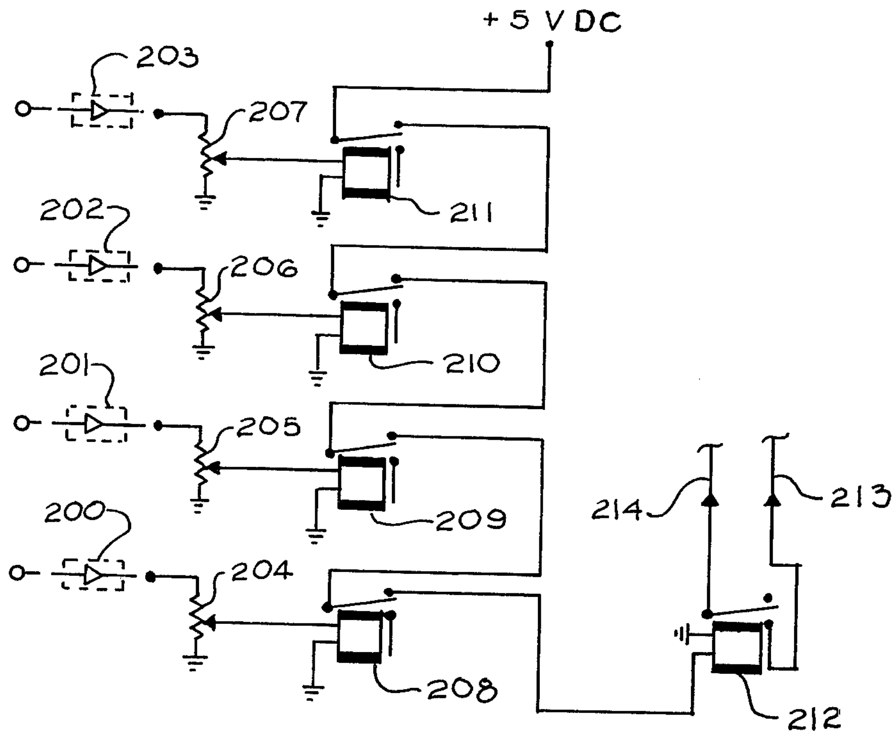
FIG. 9 shows a simple relay circuit that may be used for indicating large downward changes in element currents when the array is supplied with unusually high power.

FIG. 9 shows an arrangement of relays which could be used to respond to large decreases in the element currents assuming sufficiently high power is being fed to the array and very sensitive relays are used in this arrangement. In FIG. 9 numerals 200, 201, 202, 203 are designate detectors; 204, 205, 206, 207 are dc potentiometers. Relays 208, 209, 210, 211 are sensitive relays. Relay 212 is less sensitive. The relay arrangement of FIG. 9 may be connected directly to the magnitude monitor rf outputs 88, 89, . . . , 91 of the network of FIG. 5. In such a case eight, instead of four, sensitive relays such as 208, . . . , 211 are necessary.

Figure 10:
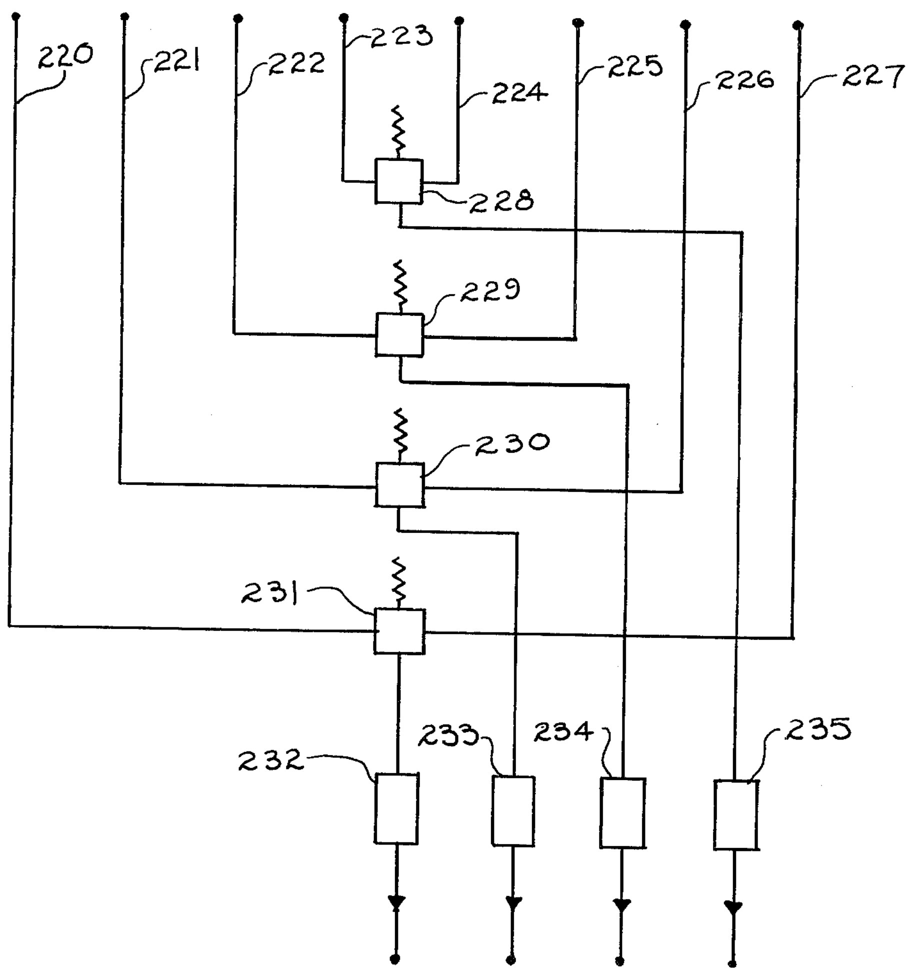
FIG. 10 shows a circuit used to combine samples of the currents in symmetrically arranged elements in the array for use in magnitude monitors.

Another arrangement which results in approximately doubled voltages being delivered to the potentiometers 204, . . . , 207 in FIG. 9 and requires only one half the number of sensitive relays makes use of the intermediate network shown in FIG. 10. In this figure 220, 221, . . . , 227 are coaxial lines which are connected to the rf outputs 84, 89, . . . , 91 of the magnitude monitors as shown for an array with eight elements, in FIG. 5. Hybrids 228, 229, . . . , 231 are used to add sample signals from symmetrically arranged elements in the array. For example, hybrid 231 is used to add signals from the end elements, hybrid 228 is used to add signals from the two elements nearest the center of the array. In order that such additions of rf signals result in the maximum outputs from the hybrids, the path lengths of the two lines feeding each hybrid should preferably be equal. The path lengths of the lines feeding different hybrids need not be equal except for logistical reasons. The sum outputs of the hybrids 228, . . . , 231 are connected to detectors 232, . . . , 235. The dc outputs of these detectors may be connected directly to potentiometers 204, 205, . . . , 207 in the relay arrangement of FIG. 9. It is noted that if all lines on one side of the array connected to the hybrids of FIG. 10 are made a half wave longer than the corresponding lines on the other side of the array, the difference outputs should be connected to the detectors.

When the intermediate circuit of FIG. 10 is used to feed the relay group of FIG. 9, a change in element current from its normal value zero results in a smaller change in voltage delivered to the corresponding potentiometer in FIG. 9, namely, from its normal value to one half of this value. Smaller changes in element currents also show up as still smaller changes in dc voltages applied to the potentiometers. The use of the intermediate circuit of FIG. 10, however, reduces the number of parts by a factor of two and increases the signals by a factor of two. Satisfactory monitoring of even small changes can be affected in spite of the reduction effect by the intermediate circuit of FIG. 10 if the solid state circuit of FIG. 11 is used in place of the relay arrangement of FIG. 9.

Figure 11:
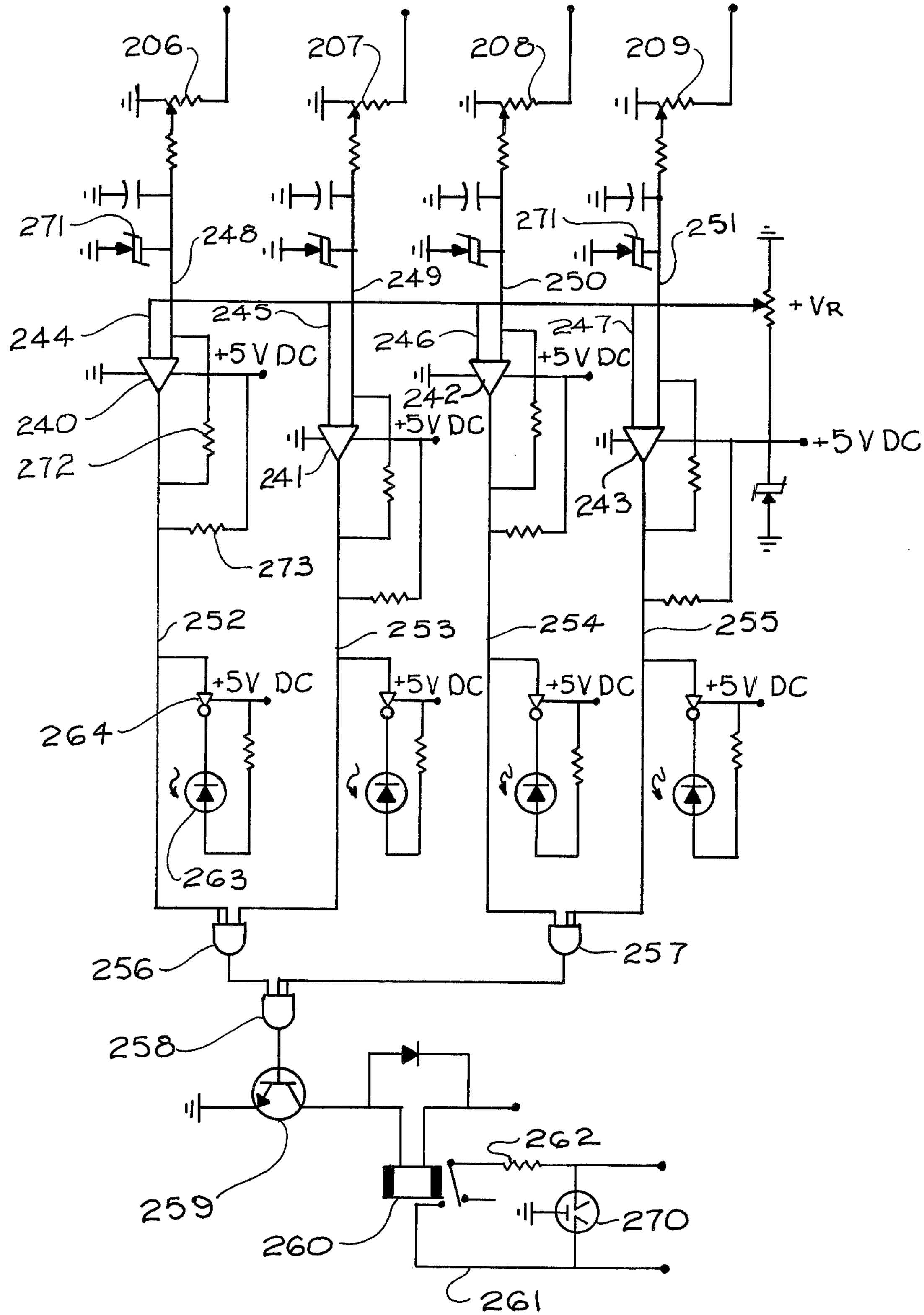
FIG. 11 shows a network which in accordance with this invention may be used to indicate small decreases in the magnitudes of radiating element currents.

In the network of FIG. 11 potentiometers 206, 207, . . . , 209 may receive dc voltages from the detectors 232, 233, . . . , 235 of the intermediate network of FIG. 10 or, as in FIG. 9 be provided with its own detectors such as 200, 201, . . . , 203 in FIG. 9 for direct connections of their rf inputs with the magnitude monitor lines 84, 85, . . . , 91.

Figure 12:
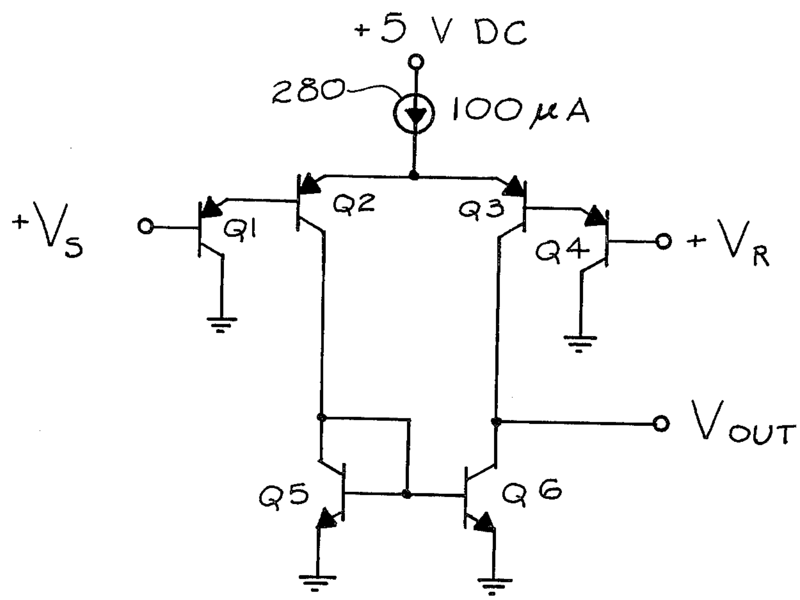
FIG. 12 shows a simplified diagram of comparator used in the network of FIG. 11.

Potentiometers 206, . . . , 209 are used to adjust the voltages applied to solid state comparator circuits of the type shown in FIG. 12. There is one comparator circuit per line. Each comparator has two inputs, a "signal input" such as 248, . . . , 251 and a "standard input" such as 244, . . . , 247. It is convenient to use the same standard input voltage in all comparators, for example, $V_R$ = 0.5 volts, and to adjust the incoming signal voltages with potentiometers 206, . . . , 209 so that each signal voltage applied to its comparator is set at the same value $V_S$ which is greater than the standard $V_R$. Should the value of $V_S$ fall below $V_R$ the comparator circuit suddenly changes its output voltage. The output lines 252, . . . , 255 of the comparators are connected to "AND" networks 256, 257. These networks are connected to another "AND" network 258, the output of which, amplified by transistor 259, operates relay 260 that is normally energized. When signal voltages $V_S$ falls below the standard voltage $V_R$ relay 260 drops out and the flow of current in conductors 261, 262 is interrupted. This relay 260 may be used to ring a bell, light a light or shut down the localizer transmitter.

Light emitting diodes LED's, such as 263 are used to indicate in which circuit branch $V_S$ dropped below $V_o$. Isolating amplifiers, such as 264 are used to operate the LED's without imposing extra drain in the main lines, such as 252.

Gas discharge device 270 is used to protect relay 260 from lightning surges. Zener diodes such as 271 are used to protect comparators 248, . . . , 251. Resistors such as 271 are feedback resistors. Resistors such as 273 are used to accelerate the response of the comparators.

A simplified circuit of a comparator is shown in FIG. 12. In this figure $Q_1$, $Q_2$ are transistors in Darlington arrangement. Transistors $Q_3$, $Q_4$ are similar to transistors $Q_1$, $Q_2$. Device 280 is a current limiter which makes the power supply act as a current source.

The circuit in FIG. 11, used together with networks such as is shown in FIG. 5, has been found to be very stable and is capable of being used to monitor small changes in currents, for example, of the order of 15%.

It has already been stated in connection with FIG. 5 that the sample signals from the central portion of the array are much stronger than the sample signals from the end elements. In fact the signals from the central group of elements are usually so strong as to overload the magnitude monitor detectors such as 232, 233, . . . , 235 or 200, 210, . . . , even when the intermediate network of FIG. 10 is not used. In order to correct this condition and to secure linear response as well as operation within the convenient portion of the range of the potentiometers, such as 207, 208 it is usually necessary to insert resistance pads into the rf lines supplying said detectors. The approximate values of attenuation for each pad, although it is not critical, can be easily predicted from the current distribution used in a particular array.

I claim:

1. A monitor for a localizer antenna array with a plurality of radiating elements comprising:

(1) Means for obtaining sample currents proportional to the currents in the radiating elements, (2) Means for impedance matching each sampling means, (3) Means for dividing sample currents into three sets of parts in accordance with fixed proportions, (4) Means for combining the first set of sample currents using equal electrical paths and adding networks to obtain a resultant used to indicate course position, (5) Means for combining a second set of currents using electrical paths in proportion to the distances from an end element to each of the other elements in the array, (6) Means for comparing the magnitude of the current samples in the third set with present standards and (7) Means for reducing interference by the first and second sets of samples with the magnitudes of the samples in the third set.

2. A monitor for a localizer antenna in accordance with claim 1 wherein means for dividing sample currents into three sets of samples comprise a first set of hybrids and a second set of hybrids.

3. A monitor for a localizer array in accordance with claim 1 wherein means for reducing interference by the first and second sets of current samples with the magnitudes of the samples in the third set comprise a substantial cancellation of the effect of the current samples in the first set by the effect of the current samples in the second set.

4. A monitor for a localizer array as in claim 1 wherein the means for comparing a magnitudes of the current samples with preset standards comprises the addition of current samples in pairs.

* * * * *